INVENTORS
LYNDON D. BOYER,
ARNOLD L. COLDIRON,
AND SOON Y. WONG
BY
ATTORNEY

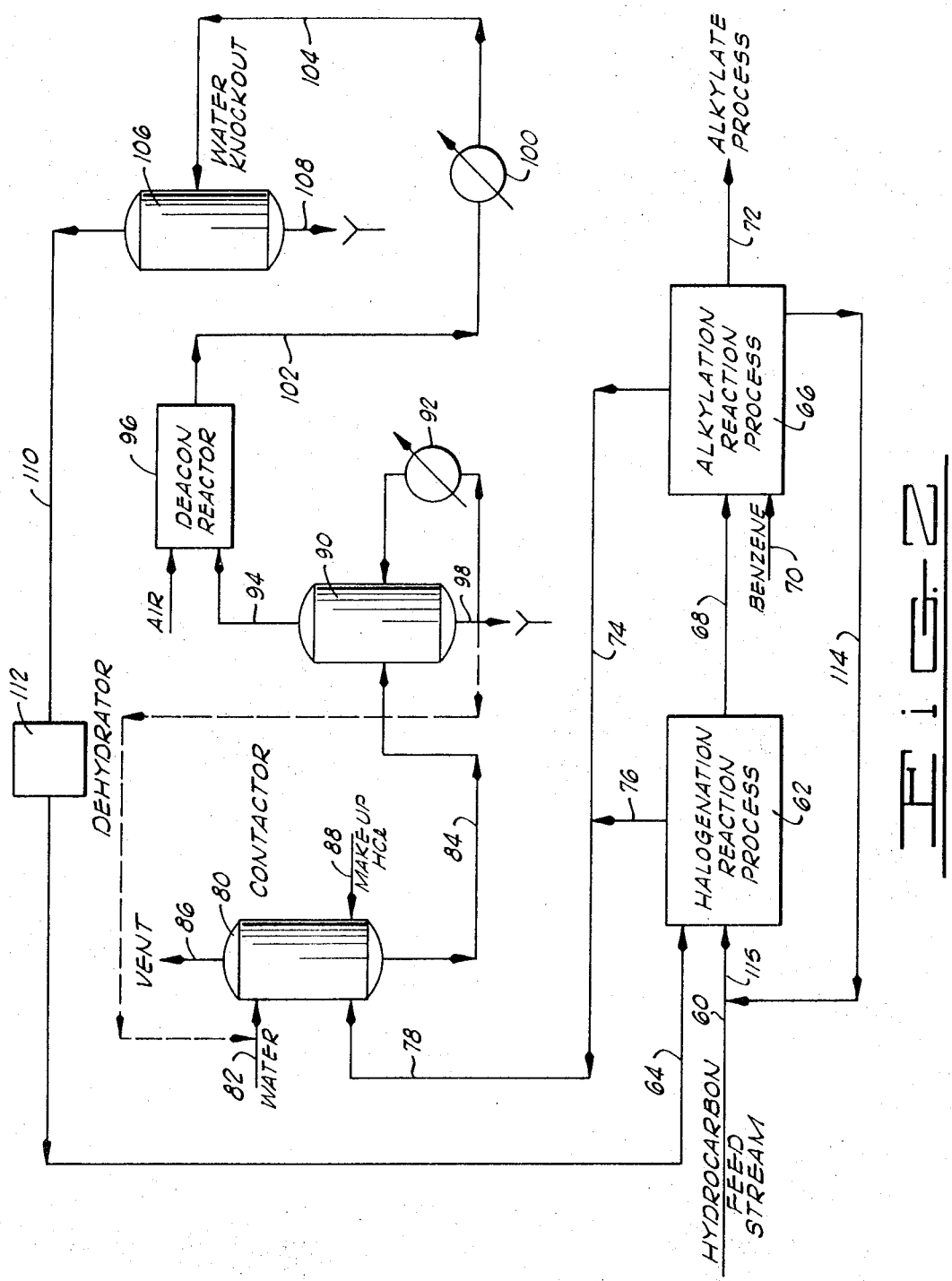

United States Patent Office 3,655,801
Patented Apr. 11, 1972

3,655,801
PROCESS FOR PRODUCING FREE HALOGEN FROM HYDROGEN HALIDE AND UTILIZING THE FREE HALOGEN IN HALOGENATION REACTIONS
Lyndon D. Boyer, Ponca City, Okla., Arnold L. Coldiron, Ridgefield, Conn., and Soon Y. Wong, Ponca City, Okla., assignors to Continental Oil Company, Ponca City, Okla.
Filed Aug. 11, 1969, Ser. No. 848,809
Int. Cl. C07c 3/54
U.S. Cl. 260—671 B
24 Claims

ABSTRACT OF THE DISCLOSURE

The present invention relates to an improved process for producing free halogen from hydrogen halide and utilizing the free halogen produced in halogenation reactions. The hydrogen halide produced in reactions wherein a hydrocarbon feed stream is halogenated, or reactions wherein a hydrocarbon feed stream is halogenated and then used to alkylate a cyclic organic compound, is oxidized to form an effluent gas stream containing free halogen, water and other gases. In one aspect of the present invention the effluent gas stream is intimately contacted with the hydrocarbon feed stream so that the free halogen is selectively absorbed in the hydrocarbon feed stream, and the remaining effluent gas stream is vented from the process. Another aspect of the invention relates to utilizing the effluent gas stream directly for effecting the halogenation reaction, separating the hydrogen halide produced from the other gases by absorbing the hydrogen halide in water and venting the other gases.

BACKGROUND OF THE INVENTION

(1) Field of the invention

The present invention relates generally to processes for producing free halogen from hydrogen halide and utilizing the free halogen in halogenation reactions, and more particularly, but not by way of limitation, to a process wherein the hydrogen halide is oxidized to form free halogen and other gases, the free halogen is utilized in a halogenation reaction and the other gases are vented from the process.

(2) Description of the prior art

Hydrogen halide is produced as a byproduct in a great number of commercial processes wherein a hydrocarbon feed stream is reacted with a halogen to produce a halogenated hydrocarbon. For example, in the production of straight chain detergent alkylate, a fraction of straight chain aliphatic hydrocarbons, such as normal paraffin hydrocarbons, is halogenated, and the halo-paraffins thus produced are used to alkylate a suitable aromatic material, such as benzene. In both the halogenation reaction and the alkylation reaction, hydrogen halide is produced as a byproduct. Most commonly the halogen used in these processes is chlorine, and the hydrogen halide byproduct is hydrogen chloride. Commonly, the hydrogen chloride from both reactions is combined in water and sold as byproduct muriatic acid.

In areas where muriatic acid markets are not available or not attractive, the byproduct hydrogen chloride presents a disposal problem. Usually, the most attractive alternative in this case is to convert the hydrogen chloride to chlorine and recycle the chlorine to the halogenation reaction. Many methods and processes have been developed for producing a free halogen from a hydrogen halide. For example, in the past a halogen has been generated from hydrogen halide by oxidation processes using oxidizing agents, by formation of metal halides followed by oxidation of the halides formed, by continuous catalytic oxidation processes with the use of air or free oxygen as the oxidizing agent, as in the Deacon process, and by electrolytic processes. Of these processes, the Deacon process has been used commercially because it is a continuous catalytic process wherein free oxygen or the oxygen contained in air is used as the oxidizing agent, and per pass conversions are relatively high. This process suffers from the disadvantage, however, that the effluent contains water, unconverted hydrogen halide, oxygen and nitrogen as well as the halogen. Liquification and separation of the halogen from the other constituents is difficult and rather expensive in that low temperature fractionation or condensation methods are required. While it is desirable to utilize the effluent from the Deacon process directly in halogenation processes and detergent alkylate processes, such has not been feasible due to build up of inerts in the process system.

The present invention provides an economical process wherein the hydrogen halide byproduct produced in halogenation reactions and alkylation reactions may be oxidized with air in a Deacon reactor to form an effluent containing free halogen, water, unreacted hydrogen halide and inert constituents, and the free halogen reused in the halogenation reaction without buildup of inerts in the process system.

SUMMARY OF THE INVENTION

The present invention relates to a process wherein a halogen is reacted with a hydrocarbon feed stream to produce a halogenated hydrocarbon stream and a hydrogen halide stream. The hydrogen halide stream is oxidized to form an effluent gas stream comprising free halogen, water and other gases. The effluent gas stream is cooled thereby condensing a portion of the water, and the condensed water is removed from the effluent gas stream. The effluent gas stream is then intimately contacted with the hydrocarbon feed stream so that free halogen is selectively absorbed therein, and the effluent gas stream is removed from the process.

It is, therefore, a general object of the present invention to provide a process for producing free halogen from hydrogen halide and utilizing the free halogen in halogenation reactions.

Another object of the present invention is the provision of a process wherein the hydrogen halide produced in reactions wherein a hydrocarbon feed stream is halogenated, or in reactions where a hydrocarbon feed stream is halogenated and then used to alkylate a cyclic organic compound is simply and economically converted to free halogen and the free halogen utilized in the halogenation reaction.

A further object of the present invention is the provision of a process wherein the byproduct hydrogen halide produced in halogenation reactions and alkylation reactions is oxidized with air in a Deacon reactor by means of a Deacon type catalyst to form free halogen and inert constituents, and the free halogen is reused in the halogenation reaction without the buildup of inerts in the system.

Yet another object of the present invention is the provision of a process wherein a hydrocarbon feed stream is chlorinated to form a byproduct hydrogen chloride stream, the hydrogen chloride stream is reacted with air in a Deacon reactor to form an effluent containing free chlorine and other constituents, and the free chlorine is selectively absorbed from the Deacon effluent by the hydrocarbon feed stream.

Still another object of the present invention is the provision of a process wherein byproduct hydrogen chloride is reacted with air in a Deacon reactor to form an effluent containing free chlorine and inert constituents, the free chlorine and inert constituents are directly utilized in the halogenation reaction and the inert constituents are simply and economically separated from the byproduct hydrogen chloride so that it may be recycled to the Deacon reactor.

Other objects and advantages of the invention will be evident from the following detailed description when read in conjunction with the accompanying drawings.

BRIEF DESCRIPTION OF THE DRAWINGS

FIG. 2 is a diagrammatic illustration of a process for producing detergent alkylate and apparatus for carrying out an alternate form of the process of the present invention wherein byproduct hydrogen halide is oxidized in a Deacon reactor and the Deacon effluent used directly in the halogenation reaction.

DESCRIPTION OF THE PREFERRED EMBODIMENTS

Figure 1:
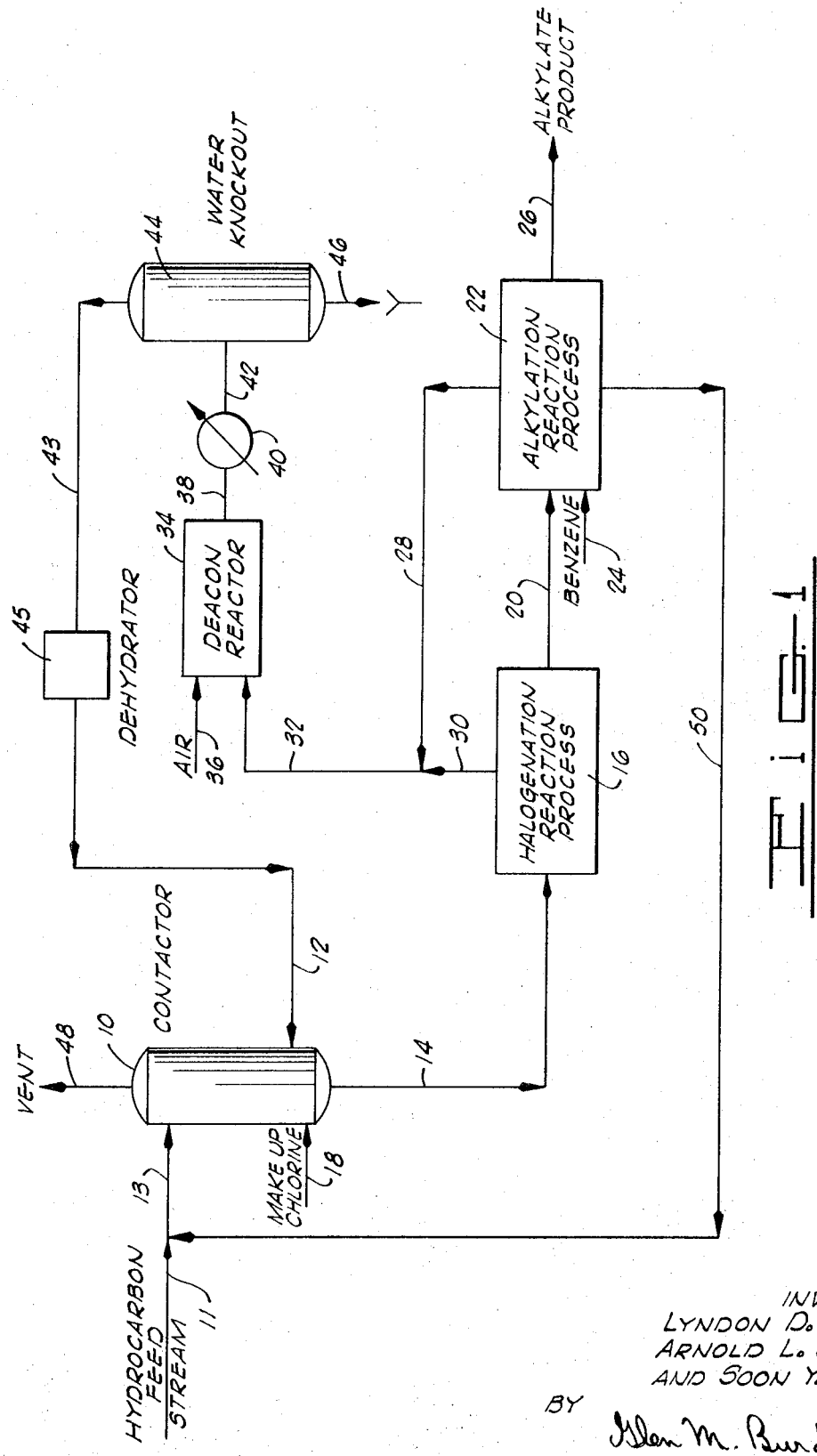
FIG. 1 is a diagrammatic illustration of a process for producing a detergent alkylate and apparatus for carrying out the process of the present invention wherein free halogen is selectively absorbed by the hydrocarbon feed stream to the process.

In the preferred form of the present invention, the byproduct hydrogen halide stream from a reaction wherein a hydrocarbon feed stream is halogenated, or from a paraffin halide reaction zone or an alkylation reaction zone, is reacted with air in a Deacon reactor by means of a Deacon-type catalyst to form an effluent gas stream comprised of free halogen, water, oxygen, nitrogen and a minor amount of unconverted hydrogen halide. The effluent is cooled to condense a portion of the water, and the condensed water removed. The cooled gas stream is dehydrated and then intimately contacted with the liquid hydrocarbon feed stream in a conventional vapor-liquid contactor. Since free halogen and hydrogen halide are much more soluble in hydrocarbons than oxygen and nitrogen, the free halogen and hydrogen halide are selectively absorbed in the hydrocarbon feed stream. The inert gases (oxygen and nitrogen) are vented from the process from the top of the contactor, and the halogen rich hydrocarbon feed stream is fed directly to the halogenation reaction. Dehydration of the cooled Deacon effluent gas stream is preferred in order to prevent excessive corrosion from taking place in downstream equipment, but is not essential to the operation of the present invention.

Referring to FIG. 1, let it be assumed that a straight chain detergent alkylate product is produced by halogenating a feed stream of normal paraffin hydrocarbons with chlorine and the chloro-paraffins used to alkylate a suitable aromatic material, such as benzene. The total normal paraffin feed stream, e.g., the fresh feed stream conducted to the process through conduit 11 and a recycle stream conducted through conduit 50, is conducted to the top of a vapor-liquid contactor designated by the numeral 10 by a conduit 13. The paraffin hydrocarbon feed stream travels downwardly in the contactor 10 intimately contacting a gas stream containing free chlorine, unreacted hydrogen chloride, and other inert gases which enters contactor 10 through conduit 12. The free chlorine and hydrogen chloride are selectively absorbed by the paraffin hydrocarbon feed stream. The chlorine rich feed stream is conducted from the bottom of contactor 10 by a conduit 14 and is led to a conventional halogenation reaction process 16. Make up chlorine required for the process is injected into the bottom portion of contactor 10 through a conduit 18. In the halogenation reaction process 16, the normal paraffin hydrocarbon feed stream is reacted with chlorine in the conventional manner to form a chloroparaffin stream and a byproduct stream of hydrogen chloride. The chloro-paraffin stream is led through conduit 20 to a conventional alkylation reaction process 22 wherein the chloro-paraffin stream is reacted with benzene, entering the alkylation reaction process through conduit 24. In the alkylation process 22 an alkylate reaction product is formed and a byproduct hydrogen chloride stream is formed. The alkylate reaction product is conducted from the alkylation process 22 through a conduit 26 for further purification processing. It will be understood that alkylation process 22 includes the necessary towers and the like to distill excess benzene and unreacted n-paraffin for recycle in addition to alkylation reactors, HCl flash vessels, etc. The byproduct hydrogen chloride stream from the alkylation process 22 is conducted through conduit 28, and is combined with the byproduct hydrogen chloride stream leaving the halogenation process 16 through conduit 30. The combined hydrogen chloride stream passes through conduit 32 into a conventional Deacon reactor 34. Air or oxygen required for the Deacon process, which is preferably air since it is cheaper than pure oxygen or oxygen concentrate, enters the Deacon reactor 34 through conduit 36. The hydrogen chloride stream is oxidized with air in the Deacon reactor 34 by means of a Deacon-type catalyst to form a gas stream comprising free chlorine, water, unreacted hydrogen chloride, oxygen and nitrogen. The gas stream is led from Deacon reactor 34 through conduit 38 to a conventional heat exchanger 40. While passing through heat exchanger 40 the gas stream is cooled causing a portion of the water contained therein to condense. The gas stream and condensed water is led from heat exchanger 40 to a conventional water knock-out 44 by conduit 42. The condensed water is removed from water knock-out 44 through conduit 46, and the gas stream passes into conduit 43. From conduit 43 the gas stream passes through a conventional dehydrator 45 wherein additional water is removed therefrom. The gas stream then enters conduit 12, passes into the bottom of contactor 10 and passes upwardly into intimate contact with the hydrocarbon stream passing downwardly therein. Due to the fact that chlorine and hydrogen chloride are much more soluble in hydrocarbons than oxygen and nitrogen, a major portion of the chlorine and the hydrogen chloride contained in the gas stream will be selectively absorbed by the hydrocarbon feed stream. The remaining gas stream, containing oxygen, nitrogen, and a small amount of chlorine, passes out of the top of contactor 10 through conduit 48 from where it may be vented to the atmosphere or processed further. In order to increase the efficiency of the absorption process carried out in contactor 10, excess hydrocarbons may be recycled from the alkylation reaction process through conduit 50 into the contactor 10. Such excess hydrocarbons result from partially chlorinating the n-paraffins employed in the alkylation reaction process wherein the chlorinated paraffins are alkylated as disclosed in U.S. Pat. 3,316,294 of George C. Feighner et al.

An alternate form of the present invention is comprised of the following steps: The hydrogen halide from a halogenation reaction is intimately contacted with water so that the hydrogen halide is absorbed therein. The water is then heated and stripped in a conventional manner to liberate the hydrogen halide, and the hydrogen halide is reacted with air in a Deacon reactor to form an effluent gas stream containing free halide, water, unreacted hydrogen halide, nitrogen and oxygen. The effluent gas stream is cooled thereby condensing a portion of the water therein, and the remaining water is removed from the gas stream by passing it through a conventional dehydrator. The dried gas stream containing free halide, unreacted hydrogen halide, oxygen and nitrogen is conducted to the halogenation reaction. The byproducts of the halogenation reaction include hydrogen halide, oxygen and nitrogen. As first mentioned above, the hydrogen halide is absorbed in water thereby separating it from the oxygen and nitrogen, and the oxygen and nitrogen are removed from the process. Dehydration of the cooled Deacon effluent gas stream is preferred to prevent excessive corrosion in downstream equipment.

Referring now to FIG. 2, let it be assumed that a feed stream of normal paraffin hydrocarbons is halogenated with chlorine to form chloro-paraffins, and the chloro-paraffins are used to alkylate a suitable aromatic material, such as benzene to form a detergent alkylate product. The normal paraffin hydrocarbon feed stream is conducted through a conduit 60 and joins a recycle normal paraffin stream conducted through conduit 114. The combined stream is conducted by conduit 115 to a conventional halogenation reaction process 62. A Deacon reactor effluent gas stream containing chlorine, unreacted hydrogen chloride, oxygen and nitrogen is conducted to the halogenation process 62 through a conduit 64. In the halogenation process the normal paraffin feed stream is reacted with the chlorine to form a chloro-paraffin stream and a byproduct stream of hydrogen chloride, oxygen and nitrogen. The chloro-paraffins are conducted to a conventional alkylation process 66 through a conduit 68. In the alkylation reaction process 66 the chloro-paraffins are reacted with benzene, conducted to the alkylation process 66 through conduit 70, to form an alkylate reaction product and a hydrogen chloride byproduct. The alkylate reaction product is conducted from the alkylation process 66 through conduit 72 to further processing facilities. It will be understood that alkylation process 66 contains the necessary towers and the like to distill excess benzene and unreacted n-paraffin for recycle in addition to alkylation reaction, HCl flash vessels and the like. The byproduct hydrogen chloride stream from the alkylation process 66 is conducted through conduit 74, and is combined with the hydrogen chloride byproduct and other constituents passing from halogenation process 62 through conduit 76. The combined stream containing hydrogen chloride, nitrogen and oxygen is conducted through conduit 78 into the bottom portion of a conventional vapor-liquid contactor 80. Water is conducted to the top portion of vapor-liquid contactor 80 through conduit 82 and passes downwardly within contactor 80 thereby intimately contacting the hydrogen chloride-oxygen-nitrogen stream passing upwardly therein. Since the hydrogen chloride is much more soluble in water than oxygen or nitrogen, it is absorbed by the water forming muriatic acid. The muriatic acid passes out of the bottom portion of contactor 80 through conduit 84. The oxygen and nitrogen not absorbed by the water pass from the top portion of contactor 80 into conduit 86 from where they are vented to the atmosphere. Make-up hydrogen chloride required for the process is added to the bottom portion of contactor 80 through conduit 88. From conduit 84 the muriatic acid formed in contactor 80 passes into a conventional stripper vessel 90. A conventional heat source 92 provides heat to the muriatic acid within vessel 90 causing hydrogen chloride to be liberated therefrom. The liberated hydrogen chloride passes out of vessel 90 through conduit 94 into a conventional Deacon reactor 96. Water or dilute HCl is removed from the vessel 90 through conduit 98 and may be recycled to absorber 80. The hydrogen chloride is reacted with air in the Deacon reactor 96 by means of a Deacon-type catalyst to form an effluent gas stream containing free chlorine, water, unreacted hydrogen chloride, oxygen and nitrogen. The gas stream passes from Deacon reactor 96 through conduit 102 into a conventional heat exchanger 100. While within heat exchanger 100, the gas stream is cooled thereby condensing a portion of the water contained therein. The gas stream and condensed water pass from heat exchanger 100 through conduit 104 into a conventional water knock-out 106. While within water knock-out 106, condensed water is separated from the gas stream and removed through conduit 108. The gas stream is removed from water knock-out 106 through conduit 110 from where it is conducted to a conventional dehydrator 112.

The dehydrator 112 removes water remaining in the gas stream, and the thus dehydrated gas stream passes into conduit 64 which leads it to the halogenation reaction process 62. In order to increase the efficiency of the halogenation reaction process and the alkylation reaction process, excess hydrocarbons may be recycled from alkylation process 66 through conduit 114 to inlet conduit 60. Such excess hydrocarbons result from partially chlorinating the n-paraffins employed in the alkylation reaction process wherein the chlorinated paraffins are alkylated. It is desirable to control the degree of chlorination of the n-paraffins to prevent formation of undesired byproducts such as the 1, 2, 3, 4-tetra-hydro naphthalenes, polyphenyl type compounds and the like.

Thus, in both forms of the present invention described above, by product hydrogen halide is converted to free halogen in a conventional Deacon reactor, and the inert gases generated in the Deacon reaction are inexpensively and effectively removed from the process thereby preventing the build-up of inerts in the process system. The free halogen formed in the Deacon reactor may be utilized in the halogenation process without the need for expensive halogen purification equipment such as refrigeration and fractionation facilities.

The following examples will serve to illustrate further the nature and application of the present invention, which, however, is not limited to the conversion of byproduct hydrogen chloride from paraffin hydrocarbon halogenation and alkylation reaction processes to free chlorine which may be utilized in the halogenation reaction, but may be applied for producing free halogen from a hydrogen halide and utilizing the halogen for effecting any desired halogenation reactions of organic compounds.

EXAMPLE I

Referring to FIG. 1, an 18,530 pounds per hour liquid stream of normal paraffin hydrocarbons, having a molecular weight of 184, is conducted through conduit 11 and is combined with 74,200 pounds per hour of liquid recycle hydrocarbons conducted from the alkylation reaction process 22 through conduit 50. The recycle hydrocarbon stream is comprised of 73,600 pounds per hour of normal paraffin hydrocarbons, 300 pounds per hour of the alkylate reaction product, 300 pounds per hour of benzene, and traces of chlorine, hydrogen chloride and chloro-paraffin. A total combined stream of 92,730 pounds per hour passes through conduit 13 into contactor 10. The gas stream entering contactor 10 through conduit 12 is comprised of 7,100 pounds per hour of chlorine, 50 pounds per hour of unreacted hydrogen chloride, 160 pounds per hour of oxygen, 6,160 pounds per hour of nitrogen, and traces of paraffin hydrocarbon and water, amounting to a total of 13,470 pounds per hour. Operating contactor 10 at a temperature of about 120° F. and a pressure of about 50 p.s.i.g., brings about the absorption of 7,000 pounds per hour of chlorine and 50 pounds per hour of hydrogen chlorine in the hydrocarbon stream passing through contactor 10. The gases leaving contactor 10 through conduit 48 are comprised of 100 pounds per hour of chlorine, 160 pounds per hour of oxygen, 6,160 pounds per hour of nitrogen, and a trace of paraffin hydrocarbon making a total of 6,420 pounds per hour. A make up of 100 pounds per hour of chlorine is conducted through conduit 18 to contactor 10 which is also absorbed in the liquid hydrocarbon stream. Thus, a total stream of 99,880 pounds per hour comprised of 92,130 pounds per hour of paraffin hydrocarbon, 7,100 pounds per hour of chlorine, 50 pounds per hour of hydrogen chloride, 300 pounds per hour of benzene, 300 pounds per hour of alkylate reaction product, and a trace of chloro-paraffin hydrocarbon enters the halogenation reaction process 16 through conduit 14. The chlorinated product stream leaving the halogenation process 16 through conduit 20 is made up of 73,730 pounds per hour of normal paraffin hydrocarbons, 21,850 pounds per hour of chloro-paraffin, 300 pounds per hour of benzene, 300 pounds per hour of alkylated reaction product, and traces of chlorine and hydrogen chloride amounting to a total of 96,180 pounds per hour. 3,700 pounds per hour of byproduct hydrogen chloride including traces of normal paraffin and chlorine passes into conduit 30 from halogenation process 16. The halogenation process 16 is carried out at a temperature of 280° F. and a pressure of 50 p.s.i.g. The alkylation reaction process is carried out at a temperature of about 150° F. and a pressure of 0 p.s.i.g. 7,800 pounds per hour of benzene is conducted to the alkylation reaction process through conduit 24, and 26,130 pounds per hour of alkylate product is conducted from the alkylation process through conduit 26, made up of 130 pounds per hour of normal paraffin hydrocarbon and 26,000 pounds per hour of detergent alkylate. The byproduct hydrogen chloride stream leaving the alkylation process 22 through conduit 28 amounts to 3,650 pounds per hour of hydrogen chloride with traces of normal paraffin hydrocarbon, chlorine and benzene. The combined stream passing through conduit 32 into the Deacon reactor 34 is made up of 7,350 pounds per hour of hydrogen chloride with traces of paraffin hydrocarbon, chlorine and benzene. 7,920 pounds per hour of air comprised of 1,760 pounds per hour of oxygen and 6,160 pounds per hour of nitrogen is reacted with the combined hydrogen chloride stream to form an effluent gas stream made up of 7,100 pounds per hour of chlorine, 50 pounds per hour of unreacted hydrogen chloride, 1,800 pounds per hour of water, 160 pounds per hour of oxygen, 6,160 pounds per hour of nitrogen, and traces of paraffin hydrocarbon and benzene. The Deacon reaction is carried out at a temperature of about 750° F. and a pressure of 5 p.s.i.g. The Deacon effluent is cooled in heat exchanger 40 to a temperature of 100° F. bringing about the condensation of 1,800 pounds per hour of water. The condensed water contains traces of normal paraffin hydrocarbon, chlorine, hydrogen chloride and benzene.

As will be understood, the halogenation reaction process 16, alkylation reaction process 22 and the Deacon reaction include a number of steps, and the conditions given above are for the principle reactions taking place therein.

EXAMPLE II

Referring now to FIG. 2, a feed stream of 18,530 pounds per hour of normal paraffin hydrocarbons, having a molecular weight of 184, is combined with 74,200 pounds per hour of recycle hydrocarbons passing through conduit 114. The recycle stream is made up of 73,600 pounds per hour of normal paraffin hydrocarbon, 300 pounds per hour of benzene, 300 pounds per hour of alkylate reaction product and traces of chlorine, hydrogen chloride, and chloro-paraffin. The total combined feed stream entering the halogenation reaction process 62 is made up of 92,130 pounds per hour of normal paraffin hydrocarbon, 300 pounds per hour of benzene, 300 pounds per hour of detergent alkylate product and traces of chlorine, hydrogen chloride and chloro-paraffin. The halogenation reaction is carried out at a temperature of 280° F. and a pressure of 50 p.s.i.g., and results in a product stream of 96,180 pounds per hour passing through conduit 68 which is made up of 73,730 pounds per hour of normal paraffin hydrocarbon, 21,850 pounds per hour of chloro-paraffin, 300 pounds per hour of benzene, 300 pounds per hour of detergent alkylate product and traces of chlorine and hydrogen chloride. The Deacon reactor effluent gas stream entering the halogenation reaction process 62 through conduit 64 amounts to 13,470 pounds per hour made up of 7,100 pounds per hour of chlorine, 50 pounds per hour of unreacted hydrogen chloride, 160 pounds per hour of oxygen and 6,160 pounds per hour of nitrogen. The byproduct stream leaving the halogenation reaction process 62 through conduit 76 is made made up of 3,700 pounds per hour of hydrogen chloride, 160 pounds per hour of oxygen, 6,160 of nitrogen, and traces of normal paraffin hydrocarbon and chlorine. 7,800 pounds per hour of benzene is conducted to the alkylation reaction process 66 through conduit 70, and the reaction is carried out at a temperature of 150° F., and a pressure of 0 p.s.i.g. A stream of alkylate reaction product made up of 26,000 pounds per hour of detergent alkylate, 130 pounds per hour of normal paraffin hydrocarbon, and traces of chlorine, hydrogen chloride, and chloro-paraffin passes through conduit 72. The byproduct stream from the alkylation reaction process 66 passing through conduit 74 is made up of 3,650 pounds per hour of hydrogen chloride and traces of normal paraffin hydrocarbon, chlorine and benzene. The combined byproduct stream passing through conduit 78 into contactor 80 is made up of 7,350 pounds per hour of hydrogen chloride, 160 pounds per hour of oxygen, 6,160 pounds per hour of nitrogen and traces of paraffin hydrocarbon, chlorine and benzene. Contactor 80 is operated at a temperature of 120° F. and a pressure of 5 p.s.i.g., and the gas stream passing out of contactor 80 through conduit 86 is made up of 70 pounds per hour of hydrogen chloride, 160 pounds per hour of oxygen, 6,160 pounds per hour of nitrogen, and traces of paraffin hydrocarbon and chlorine making a total of 6,390 pounds per hour. 70 pounds per hour of make up hydrogen chloride passes through conduit 88 into the bottom of contactor 80. The stream of muriatic acid passing through conduit 84 into stripper vessel 90 is made up of 7,350 pounds per hour of hydrogen chloride, excess water and traces of paraffin hydrocarbon and chlorine. The hydrogen chloride stream passing through conduit 94 into Deacon reactor 96 is made up of 7,350 pounds per hour of hydrogen chloride and traces of paraffin hydrocarbon and chlorine. In the Deacon reactor 96, the hydrogen chloride stream is reacted with 7,920 pounds per hour of air made up of 1,760 pounds per hour of oxygen and 6,160 pounds per hour of nitrogen to form an effluent gas stream made up of 7,100 pounds per hour of chlorine, 50 pounds per hour of unreacted hydrogen chloride, 1800 pounds per hour of water, 160 pounds per hour of oxygen, 6,160 pounds per hour of nitrogen and a trace of paraffin hydrocarbon. The Deacon reaction is carried out at a temperature of 750° F. and a pressure of 5 p.s.i.g. The effluent gas stream is cooled in heat exchanger 100 to a temperature of 100° F. at a pressure of 5 p.s.i.g. thereby condensing 1800 pounds per hour of water. As in Example I, the pressures and temperatures given for the various reactions are only for the principle reactions taking place.

The application of the process of this invention permits the economical recovery of substantially all of the byproduct hydrogen chloride as free chlorine and the utilization of this chlorine for effecting the chlorination reaction. It permits the recovery of substantially all of the hydrogen chloride from the Deacon effluent and its reuse in the process by means of a simple absorption operation, eliminating the expensive purification of chlorine by low temperature fractionation of condensation methods.

This invention is not limited to the regeneration of chlorine from hydrogen chloride and its utilization, but may be applied to regenerate free halogens from any hydrogen halide byproduct from the halogenation of an organic feed stream.

The present invention, therefore, is well adapted to carry out the objects and attain the ends and advantages mentioned, as well as those inherent therein. While presently preferred embodiments of the invention are given for the purpose of disclosure, numerous changes may be made which will readily suggest themselves to those skilled in the art and which are encompassed within the spirit of the invention disclosed herein.

What is claimed is:

1. In a process wherein a halogen is reacted with a hydrocarbon feed stream to produce a halogenated bydrocarbon stream and a hydrogen halide stream, the improvement comprising the steps of:

oxidizing said hydrogen halide stream to form a gas stream comprising free halogen, water and inert gases;

cooling said gas stream thereby condensing a portion of said water;

removing said condensed water from said gas stream;

intimately contacting said cooled gas stream with said hydrocarbon feed streams so that free halogen is selectively absorbed therein and separated from said inert gases;

removing said inert gases from said process; and reacting said hydrocarbon feed stream and absorbed free halogen to form said halogenated hydrocarbon stream and said hydrogen halide stream.

2. The process of claim 1 which is further characterized to include the step of dehydrating said cooled gas stream prior to intimately contacting it with said hydrocarbon feed stream.

3. The process of claim 1 wherein the step of oxidizing said hydrogen halide stream comprises reacting said hydrogen halide stream with air in a Deacon reactor by means of a Deacon type catalyst.

4. The process of claim 1 wherein said hydrocarbon feed stream is comprised of normal paraffin hydrocarbons.

5. The process of claim 1 wherein said halogen is chlorine.

6. In a process wherein a halogen is reacted with an aliphatic hydrocarbon feed stream to form a halogenated hydrocarbon stream and a hydrogen halide stream, and the halogenated hydrocarbon stream is reacted with a cyclic organic compound to form an alkylate reaction product stream and a hydrogen halide stream, the improvement comprising:

combining said hydrogen halide streams;

oxidizing said combined hydrogen halide stream to form a gas stream comprising free halogen, water and inert gases;

cooling said gas stream thereby condensing a portion of said water;

removing said condensed water from said gas stream;

intimately contacting said effluent gas stream with said hydrocarbon feed stream so that said free halogen is selectively absorbed therein and separated from said inert gases;

removing said inert gases from said process; and reacting said hydrocarbon feed stream and absorbed free halogen to form said halogenated hydrocarbon stream and said hydrogen halide stream.

7. The process of claim 6 which is further characterized to include the step of dehydrating said cooled gas stream prior to intimately contacting it with said hydrocarbon feed stream.

8. The process of claim 6 wherein the step of oxidizing said combined hydrogen halide stream comprises reacting said hydrogen halide stream with air in a Deacon reactor by means of a Deacon type catalyst.

9. The process of claim 6 wherein said hydrocarbon feed stream is comprised of normal paraffin hydrocarbons.

10. The process of claim 6 wherein said halogen is chlorine.

11. The process of claim 6 wherein the cyclic organic compound is benzene.

12. The process of claim 6 which is further characterized to include the step of recycling excess of said hydrocarbon feed stream through said halogenation and alkylation reactions into intimate contact with said cooled gas stream.

13. In a process wherein a halogen is reacted with a hydrocarbon feed stream to produce a halogenated hydrocarbon stream and a hydrogen halide stream, the improvement comprising:

oxidizing said hydrogen halide stream to form a gas stream comprising free halogen, water and inert gases;

cooling said gas stream thereby condensing a portion of said water;

removing said condensed water from said gas stream;

reacting said gas stream with said hydrocarbon feed stream to form said halogenated hydrocarbon stream and a stream comprised of hydrogen halide and said inert gases;

intimately contacting said stream of hydrogen halide and inert gases with water so that hydrogen halide is absorbed therein and separated from said inert gases;

removing said inert gases from said process; and stripping said absorbed hydrogen halide from said water to form said hydrogen halide stream.

14. The process of claim 13 which is further characterized to include the step of dehydrating said cooled gas stream prior to reacting it with said hydrocarbon feed stream.

15. The process of claim 13 wherein the step of oxidizing said hydrogen halide stream comprises reacting said hydrogen halide stream with air in a Deacon reactor by means of a Deacon type catalyst.

16. The process of claim 13 wherein said hydrocarbon feed stream is comprised of normal paraffin hydrocarbons.

17. The process of claim 13 wherein said halogen is chlorine.

18. In a process wherein a halogen is reacted with an aliphatic hydrocarbon feed stream to form a halogenated hydrocarbon stream and a hydrogen halide stream, and the halogenated hydrocarbon stream is reacted with a cyclic organic compound to form an alkylate reaction product stream and a hydrogen halide stream, the improvement comprising:

oxidizing a hydrogen halide stream to form a gas stream comprising free halogen, water and inert gases;

cooling said gas stream thereby condensing a portion of said water;

removing said condensed water from said gas stream;

reacting said gas stream with said hydrocarbon feed stream to form said halogenated hydrocarbon stream and a stream comprised of hydrogen halide and said inert gases;

reacting said halogenated hydrocarbon stream with said cyclic organic compound to form said alkylate reaction product stream and said hydrogen halide stream;

combining said stream of hydrogen halide and inert gases from said halogenation reaction with said hydrogen halide stream from said alkylation reaction;

intimately contacting said combined stream of hydrogen halide and inert gases with water so that hydrogen halide is absorbed therein and separated from said inert gases;

removing said inert gases from said process; and stripping said absorbed hydrogen halide from said water to form said hydrogen halide stream for said oxidation step.

19. The process of claim 18 which is further characterized to include the step of dehydrating said cooled gas stream prior to reacting it with said hydrocarbon feed stream.

20. The process of claim 18 wherein the step of oxidizing said combined hydrogen halide stream comprises reacting said hydrogen halide stream with air in a Deacon reactor by means of a Deacon type catalyst.

21. The process of claim 18 wherein said hydrocarbon feed stream is comprised of normal paraffin hydrocarbons.

22. The process of claim 18 wherein said halogen is chlorine.

23. The process of claim 18 wherein the cyclic organic compound is benzene.

24. The process of claim 18 which is further characterized to include recycling excess of said hydrocarbon feed stream through said halogenation and alkylation reactions.

References Cited

UNITED STATES PATENTS

| | | | |
|---|---|---|---|
| 2,389,230 | 11/1945 | Blumer | 260—659 A |
| 2,547,928 | 4/1951 | Davis et al. | 260—659 A |
| 2,783,286 | 2/1957 | Reynolds | 260—659 A |
| 3,303,233 | 2/1967 | Jones | 260—671 B |

CURTIS R. DAVIS, Primary Examiner

U.S. Cl. X.R.

23—219; 260—659 A, 662 A